United States Patent
Yamamori et al.

(12) 
(10) Patent No.: US 8,494,684 B2
(45) Date of Patent: Jul. 23, 2013

(54) SUBSTATION AUTOMATIC CONTROL SYSTEM

(75) Inventors: Wataru Yamamori, Fuchu (JP); Hirotoshi Saotome, Tokyo (JP); Koichi Tomaru, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/544,283

(22) Filed: Jul. 9, 2012

(65) Prior Publication Data

US 2012/0274303 A1     Nov. 1, 2012

Related U.S. Application Data

(63) Continuation of application No. PCT/JP2011/051282, filed on Jan. 25, 2011.

(30) Foreign Application Priority Data

Jan. 25, 2010  (JP) .................................. 2010-013420

(51) Int. Cl.
*G05D 3/12* (2006.01)
*G05F 3/04* (2006.01)
*H02J 1/00* (2006.01)
*H02J 3/00* (2006.01)
*G06Q 50/06* (2012.01)
*H02H 3/00* (2006.01)
*H02H 3/40* (2006.01)
*G06F 1/26* (2006.01)
*G06F 1/14* (2006.01)
*H02J 9/06* (2006.01)
*H02J 1/10* (2006.01)

(52) U.S. Cl.
CPC ................. *G06Q 50/06* (2013.01); *H02H 3/006* (2013.01); *H02H 3/40* (2013.01); *G06F 1/26* (2013.01); *G06F 1/14* (2013.01); *H02J 9/06* (2013.01); *H02J 1/102* (2013.01)

USPC ........... 700/286; 700/292; 700/294; 700/298; 323/305; 307/130; 307/82

(58) Field of Classification Search
None
See application file for complete search history.

(56) References Cited

U.S. PATENT DOCUMENTS

4,413,189 A * 11/1983 Bottom, Jr. ................... 323/260
4,602,240 A *  7/1986 Perkins et al. ................ 323/361

(Continued)

FOREIGN PATENT DOCUMENTS

JP     61-184807     8/1986
JP      7-254520    10/1995

(Continued)

OTHER PUBLICATIONS

Allan, R.N.; and Arruda, C., "LTC Transformers and MVAR Violations in the Fast Decoupled Load Flow", Sep. 1982, IEEE Transactions on Power Apparatus and Systems, PAS-101, Iss. 9, pp. 3328-3332.*

(Continued)

*Primary Examiner* — Mohammad Ali
*Assistant Examiner* — Kelvin Booker
(74) *Attorney, Agent, or Firm* — Oblon, Spivak, McClelland, Maier & Neustadt, L.L.P.

(57) ABSTRACT

According to one embodiment, there is provided a substation automatic control system. An automatic power adjusting apparatus activates an automatic voltage adjusting apparatus when a phase tap is controlled. The automatic voltage adjusting apparatus activates the automatic power adjusting apparatus when a voltage tap is controlled. The automatic power adjusting apparatus suppresses the effective power on a transmission line to the value smaller than the prescribed value while the automatic voltage adjusting apparatus is performing an automatic control, thereby maintaining transmission-side system voltage within a tolerant system voltage range.

5 Claims, 7 Drawing Sheets

U.S. PATENT DOCUMENTS

| | | | | |
|---|---|---|---|---|
| 4,956,599 | A * | 9/1990 | Nishizawa et al. | 323/244 |
| 5,155,672 | A * | 10/1992 | Brown | 363/43 |
| 5,517,423 | A * | 5/1996 | Pomatto | 700/286 |
| 5,541,498 | A * | 7/1996 | Beckwith | 323/211 |
| 5,608,646 | A * | 3/1997 | Pomatto | 700/286 |
| 5,646,512 | A * | 7/1997 | Beckwith | 323/257 |
| 5,694,329 | A * | 12/1997 | Pomatto | 700/286 |
| 5,734,586 | A * | 3/1998 | Chiang et al. | 700/286 |
| 5,760,492 | A * | 6/1998 | Kanoi et al. | 700/286 |
| 5,825,162 | A * | 10/1998 | Kida et al. | 323/210 |
| 5,982,645 | A * | 11/1999 | Levran et al. | 363/37 |
| 5,999,430 | A * | 12/1999 | Aritsuka | 363/95 |
| 6,011,381 | A * | 1/2000 | Andrei | 323/215 |
| 6,285,917 | B1 * | 9/2001 | Sekiguchi et al. | 700/239 |
| 6,335,613 | B1 * | 1/2002 | Sen et al. | 323/216 |
| 6,384,581 | B1 * | 5/2002 | Sen et al. | 323/211 |
| 6,396,248 | B1 * | 5/2002 | Sen et al. | 323/209 |
| 6,420,856 | B1 * | 7/2002 | Sen et al. | 323/209 |
| 6,670,721 | B2 * | 12/2003 | Lof et al. | 290/44 |
| 6,841,976 | B1 * | 1/2005 | Sen et al. | 323/216 |
| 6,845,301 | B2 * | 1/2005 | Hamamatsu et al. | 700/292 |
| 6,995,646 | B1 * | 2/2006 | Fromm et al. | 336/206 |
| 7,319,576 | B2 * | 1/2008 | Thompson | 361/85 |
| 7,460,930 | B1 * | 12/2008 | Howell et al. | 700/295 |
| 7,571,063 | B2 * | 8/2009 | Howell et al. | 700/295 |
| 7,706,928 | B1 * | 4/2010 | Howell et al. | 700/295 |
| 7,729,810 | B2 * | 6/2010 | Bell et al. | 700/295 |
| 7,852,050 | B2 * | 12/2010 | Berggren et al. | 323/216 |
| 8,200,372 | B2 * | 6/2012 | Joos et al. | 700/292 |
| 2002/0116092 | A1 * | 8/2002 | Hamamatsu et al. | 700/295 |
| 2002/0176265 | A1 * | 11/2002 | Oates | 363/35 |
| 2003/0011348 | A1 * | 1/2003 | Lof et al. | 322/37 |
| 2006/0025892 | A1 * | 2/2006 | Leung et al. | 700/293 |
| 2006/0195229 | A1 * | 8/2006 | Bell et al. | 700/286 |
| 2007/0041137 | A1 * | 2/2007 | Thompson | 361/85 |
| 2007/0282547 | A1 * | 12/2007 | Howell et al. | 702/60 |
| 2009/0174262 | A1 * | 7/2009 | Martin et al. | 307/82 |
| 2009/0187285 | A1 * | 7/2009 | Yaney et al. | 700/292 |
| 2009/0200290 | A1 * | 8/2009 | Cardinal et al. | 219/488 |
| 2009/0218993 | A1 * | 9/2009 | Berggren et al. | 323/205 |
| 2009/0292403 | A1 * | 11/2009 | Howell et al. | 700/292 |
| 2010/0001700 | A1 * | 1/2010 | Santos | 323/256 |
| 2010/0091527 | A1 * | 4/2010 | Asplund | 363/35 |
| 2010/0114400 | A1 * | 5/2010 | Feng et al. | 700/298 |
| 2010/0125373 | A1 * | 5/2010 | Labuschagne et al. | 700/293 |
| 2010/0198422 | A1 * | 8/2010 | Feng | 700/291 |
| 2010/0318238 | A1 * | 12/2010 | Bryson et al. | 700/298 |
| 2011/0066296 | A1 * | 3/2011 | Nelson et al. | 700/286 |
| 2011/0066301 | A1 * | 3/2011 | Donolo | 700/292 |
| 2012/0179301 | A1 * | 7/2012 | Aivaliotis et al. | 700/286 |

FOREIGN PATENT DOCUMENTS

| | | | |
|---|---|---|---|
| JP | 08280111 A | * | 10/1996 |
| JP | 2000-125473 | | 4/2000 |
| JP | 2001103666 A | * | 4/2001 |
| JP | 2002271983 A | * | 9/2002 |
| JP | 2002344460 A | * | 11/2002 |
| JP | 2003-31427 | | 1/2003 |
| JP | 2004007930 A | * | 1/2004 |
| JP | 2004-173384 | | 6/2004 |
| JP | 2004274931 A | * | 9/2004 |
| JP | 2012010461 A | * | 1/2012 |

OTHER PUBLICATIONS

Barboza, L.V.; Zurn, H.H.; and Salgado, R., "Load Tap Change Transformers: A Modeling Reminder", Feb. 2001, IEEE Power Engineering Review.*

EDSA Micro Corporation, "Paladin® DesignBase™"—Advanced Power Flow, 2008, EDSA Micro Corporation, San Diego, California.*

Gajic, Z.; and Aganovic, S., "Advanced Tapchanger Control to Counteract Power System Voltage Instability", 2006, ABB AB, Substation Automation Products, SE-721 59 Vasteras, Sweden, CRISP: Distributed Intelligence in Critical Infrastructures for Sustainable Power—ENK5-CT-2002-00673.*

Nedic, D., "Tap Adjustment in AC Load Flow", Sep. 2002, UMIST.*

Peterson, N.M.; and Meyer, W.S., "Automatic Adjustment of Transformer and Phase-Shifter Taps in the Newton Power Flow", Jan./Feb. 1971, IEEE Transactions on Power Apparatus and Systems, vol. PAS-90, No. 1.*

Wu, X.-H.; Wang, J.-C.; Yang, P.; and Piao, Z.-L., "Fuzzy Control on Voltage/Reactive Power in Electric Power Substation", 2009, Advances in Intelligent and Soft Computing, vol. 62, pp. 1083-1091.*

International Search Report mailed Apr. 26, 2011, in PCT/JP2011/051282 filed Jan. 25, 2011 (with English Translation).

International Written Opinion mailed Apr. 26, 2011, in PCT/JP2011/051282 filed Jan. 25, 2011.

JEC-2220, Standard stipulated "Japanese Electrotechnical Committee, JEC", 2008, 77 pages.

The homepage of Tohoku Electric Power Co., Ltd., http://www.tohoku-epco.co.jp/whats/news/1997/71030.htm., Oct. 30, 1997, 3 pages.

* cited by examiner

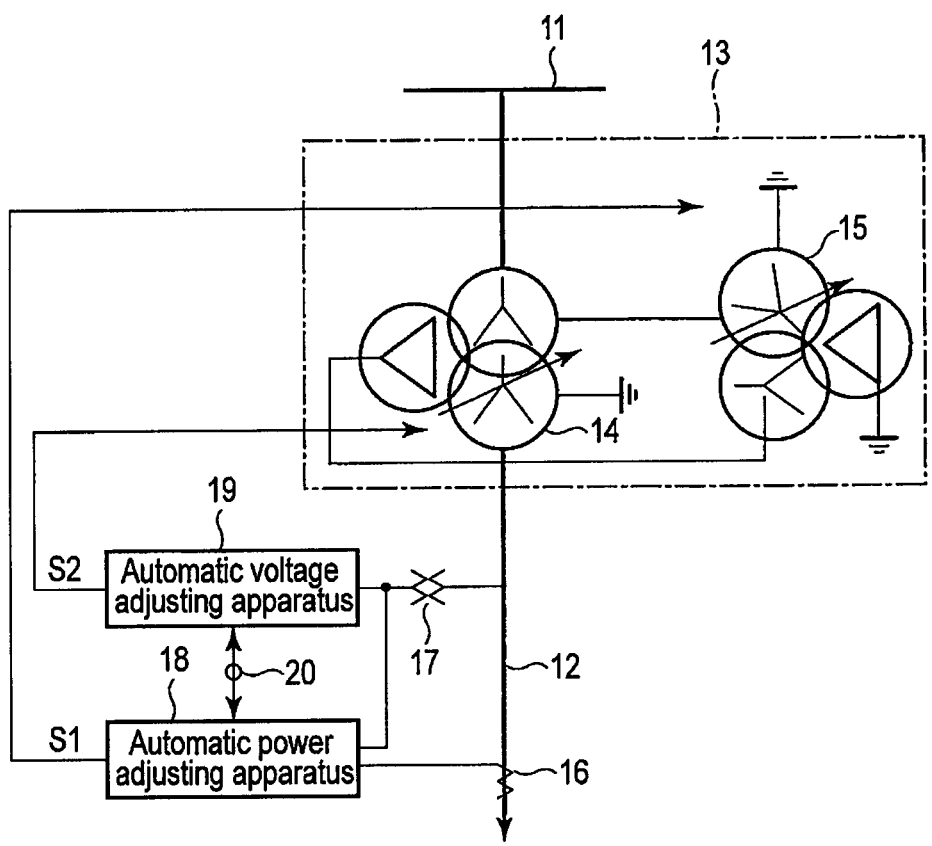
F I G. 1

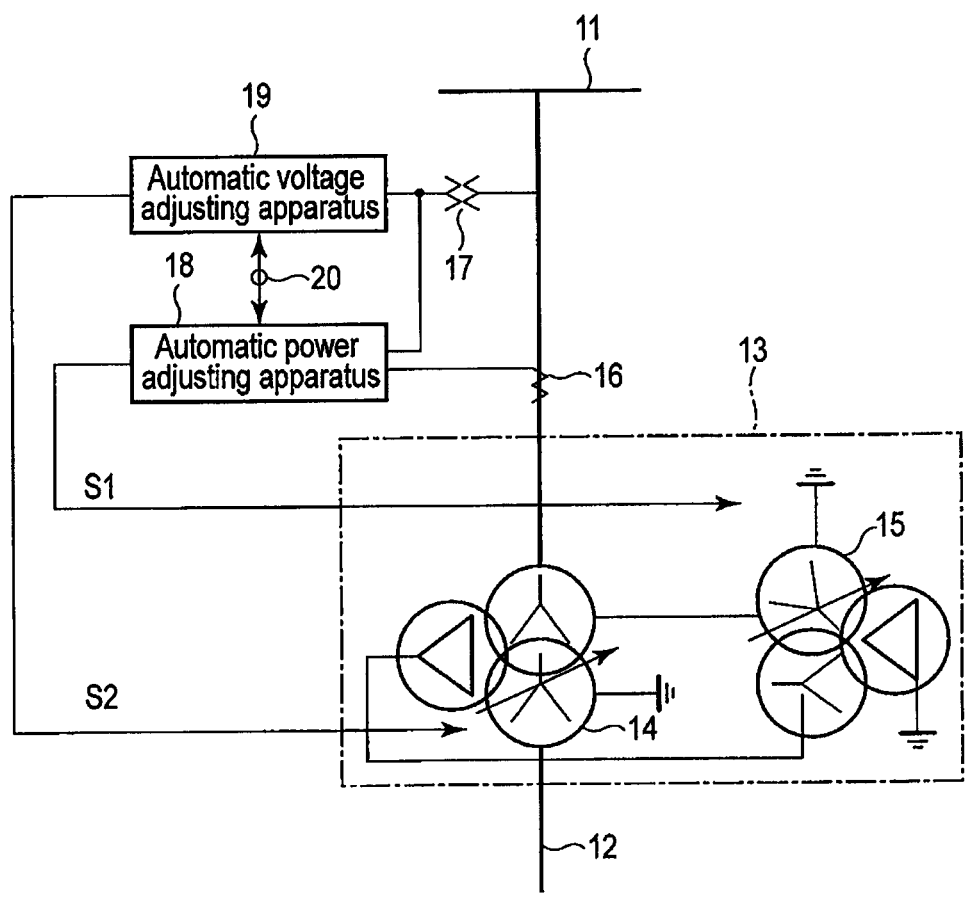
F I G. 2

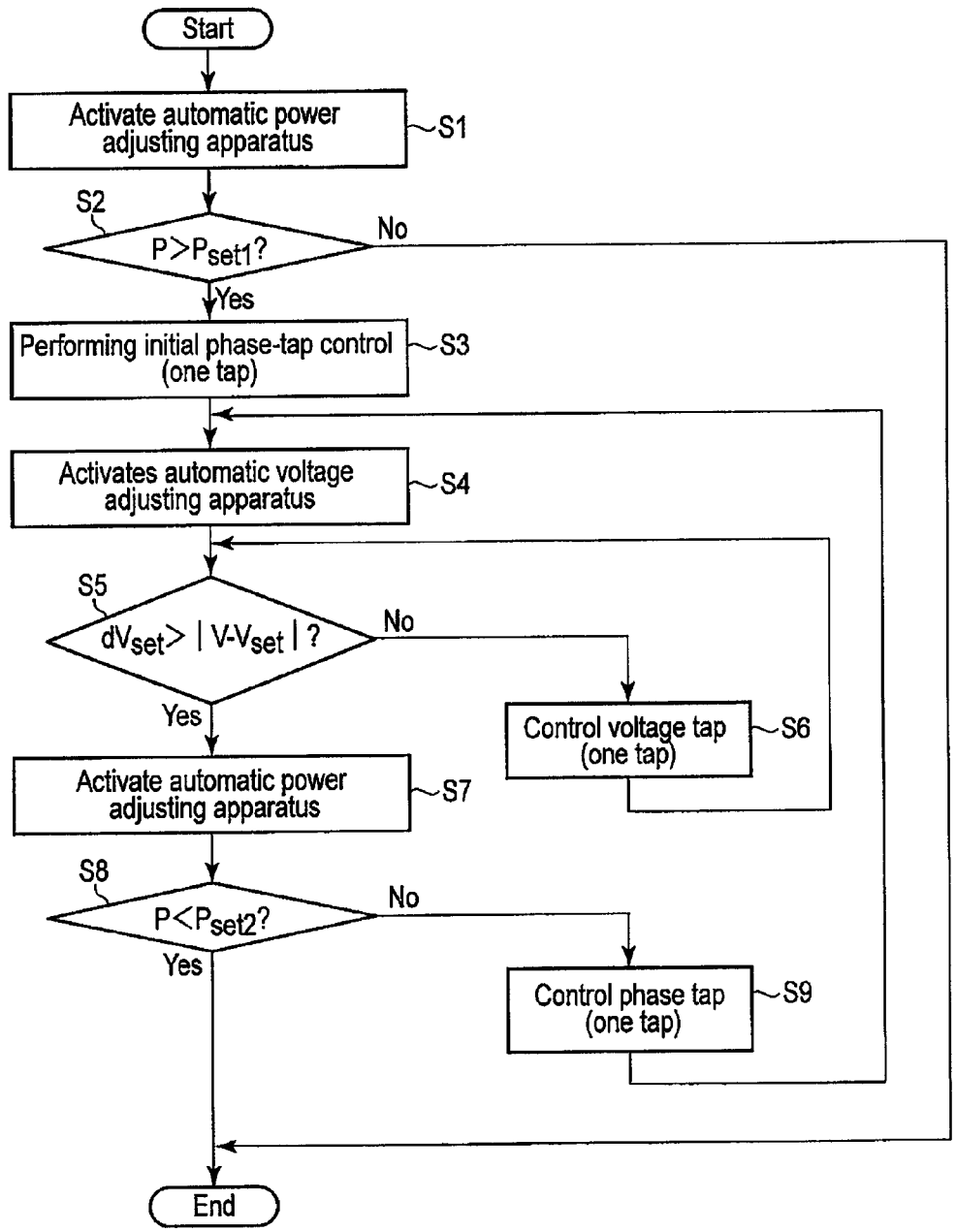
F I G. 3

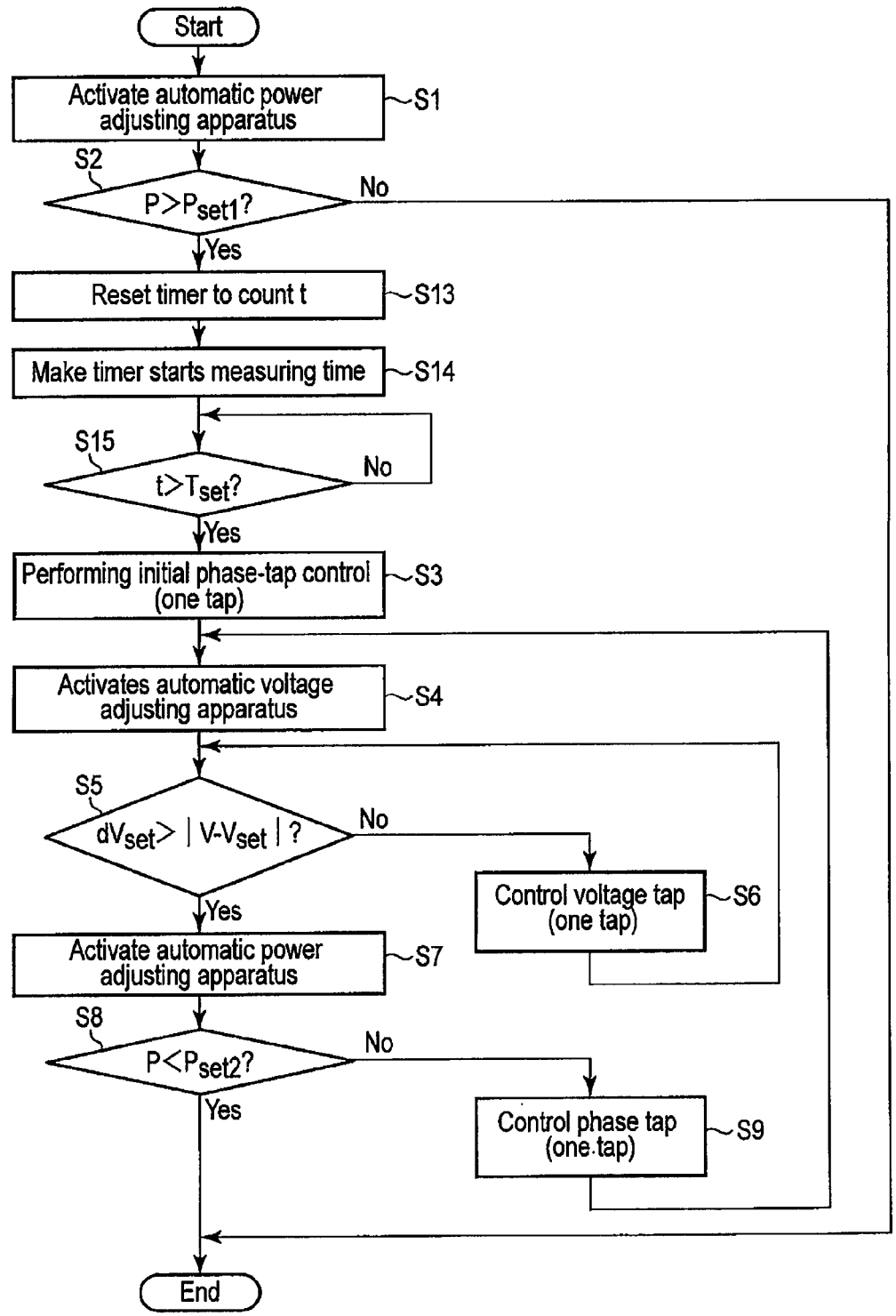
F I G. 5

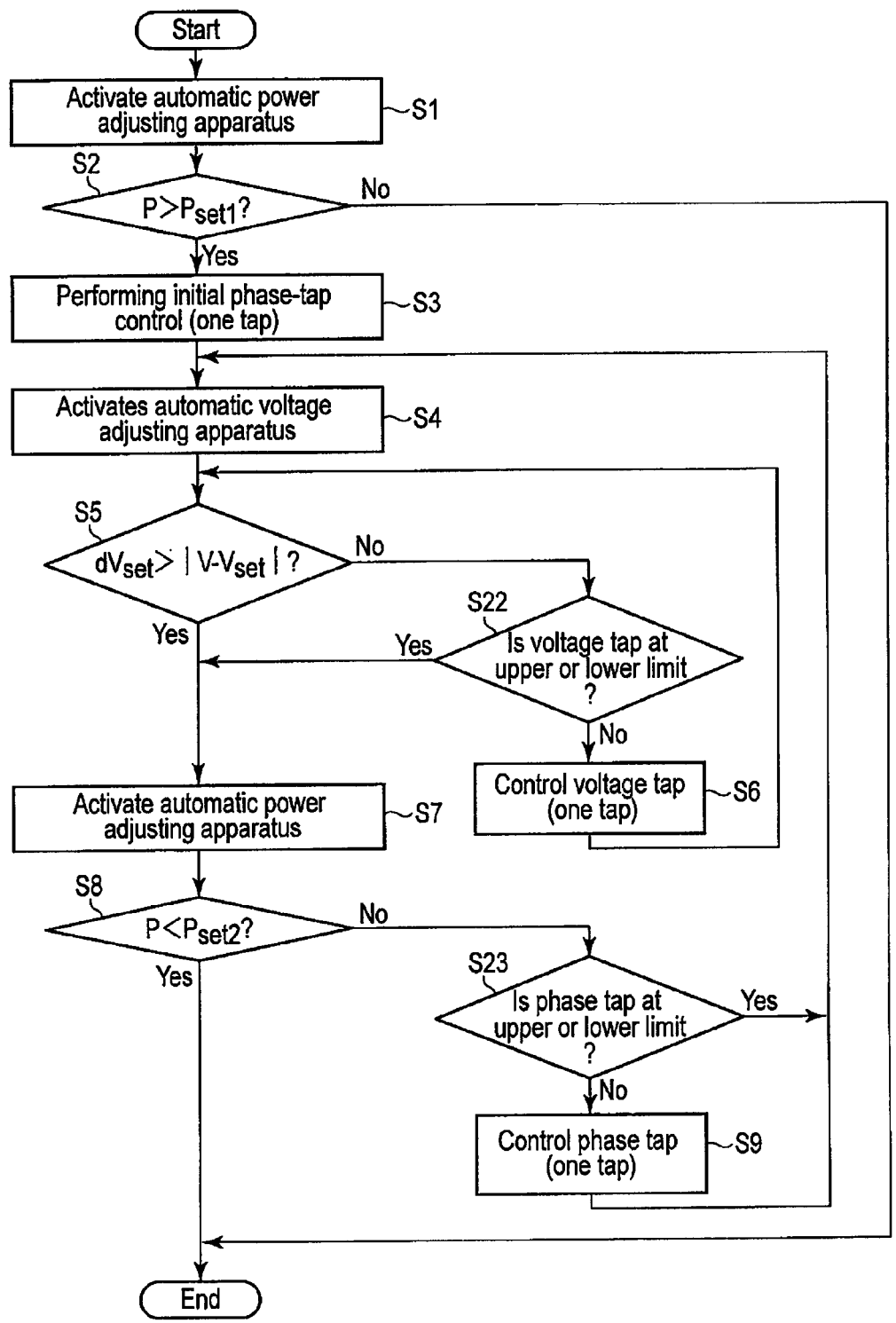
F I G. 7

SUBSTATION AUTOMATIC CONTROL SYSTEM

CROSS REFERENCE TO RELATED APPLICATIONS

This application is a Continuation Application of PCT Application No. PCT/JP2011/051282, filed Jan. 25, 2011 and based upon and claiming the benefit of priority from prior Japanese Patent Application No. 2010-013420, filed Jan. 25, 2010, the entire contents of all of which are incorporated herein by reference.

FIELD

Embodiments described herein relate generally to a substation automatic control system for automatically controlling a substation that includes a transformer having both a voltage adjusting function and an effective-power adjusting function.

BACKGROUND

Power adjusting apparatuses are known, each having a voltage adjusting function of controlling the voltage, in addition to an effective-power adjusting function of controlling the effective power by adjusting the phase angle of the transformer installed at a substation. (Refer to, for example, Jpn. Pat. Appln. KOKAI Publication No. 2000-125473.) Also known is an on-load, tap changing apparatus configured to switch the taps of a transformer while the transformer remains excited or loaded, to adjust the voltage value. (Refer to, for example, the JEC-2220 Standard stipulated by Japanese Electrotechnical Committee, JEC). An on-load, tap changing transformers are further known, each configured to switch the taps of the transformer automatically, thereby to make the voltage value of the system, where the transformer is connected, fall within a tolerant range. (Refer to, for example, Jpn. Pat. Appln. KOKAI Publication No. 2004-173384.)

Further, substation control systems are known, each having a transformer which has both a voltage adjusting function and an effective-power adjusting function and which is installed between the main bus of the substation and transmission line. In the system, an operator monitors, from time to time, the operating status of the transmission network covering a wide area, and manually moves the voltage tap and phase tap of the transformer, up or down, in accordance with the operating status of the transmission network, thereby suppressing the overload on the transmission lines or optimizing the effective power (flow), while making the voltage value of the power transmission system fall within a tolerant range. (Refer to, for example, the homepage of Tohoku Electric Power Co., Ltd., http://www.tohoku-epco.co.jp/whats/news/1997/71030.htm.)

In any substation control system using a transformer that has a voltage adjusting function and an effective-power adjusting function, the operator fast checks whether the effective power (flow) superimposed in the transmission line, either by switching or due to an accident in the adjacent transmission network, falls within the tolerant range. Then, the operator repeatedly switches the voltage tap and phase tap of the transformer having the voltage adjusting function and effective-power adjusting function, suppressing the effective-power of the power transmission system to a prescribed value, while maintaining the voltage value of the power transmission system within the tolerant range. Hence, the operator needs be highly skilled to make a proper decision in an emergency and to switch the taps by hands immediately.

There is another case that an automatic power regulator and an automatic voltage regulator are used, automatically controlling the voltage and the effective power of the power transmission system in accordance with permissible effective power on the transmission line calculated beforehand, without manual operations by operators.

If an automatic power regulator and an automatic voltage regulator perform automatic control on the voltage and the effective power of the power transmission system, however, the voltage tap and the phase tap will be simultaneously controlled in some cases, without coordination between operations of the automatic power regulator and those of the automatic voltage regulator.

In usual power transmission system, the system voltage rises if the effective power on the transmission line is suppressed. Therefore, if the voltage tap is moved down and the phase tap is simultaneously moved down to reduce the effective power, while the system voltage exceeds the upper limit of a prescribed range, the system voltage may not lower as desired, though the voltage tap is moved down to lower the system voltage. Consequently, the tap control may become unstable and excessive in some cases.

In view of the above, it is desired to provide a substation automatic control system, capable of suppressing the effective power to a prescribed value, while making a automatic power adjusting apparatus and an automatic voltage adjusting apparatus cooperate well with each other, thereby maintaining the system voltage on the transmission line within the tolerant range.

BRIEF DESCRIPTION OF THE DRAWINGS

FIG. 1 is a configuration diagram showing an example of a substation automatic control system according to an embodiment of this invention;

FIG. 2 is a configuration diagram showing another example of the substation automatic control system according to the embodiment of this invention;

FIG. 3 is a flowchart showing the processes performed in a substation automatic control system according to Embodiment 1 of the invention;

FIG. 5 is a flowchart showing the processes performed in a substation automatic control system according to Embodiment 3 of the invention; FIG. 7 is a flowchart showing the processes performed in a substation automatic control system according to Embodiment 5 of the invention.

DETAILED DESCRIPTION

Figure 4:
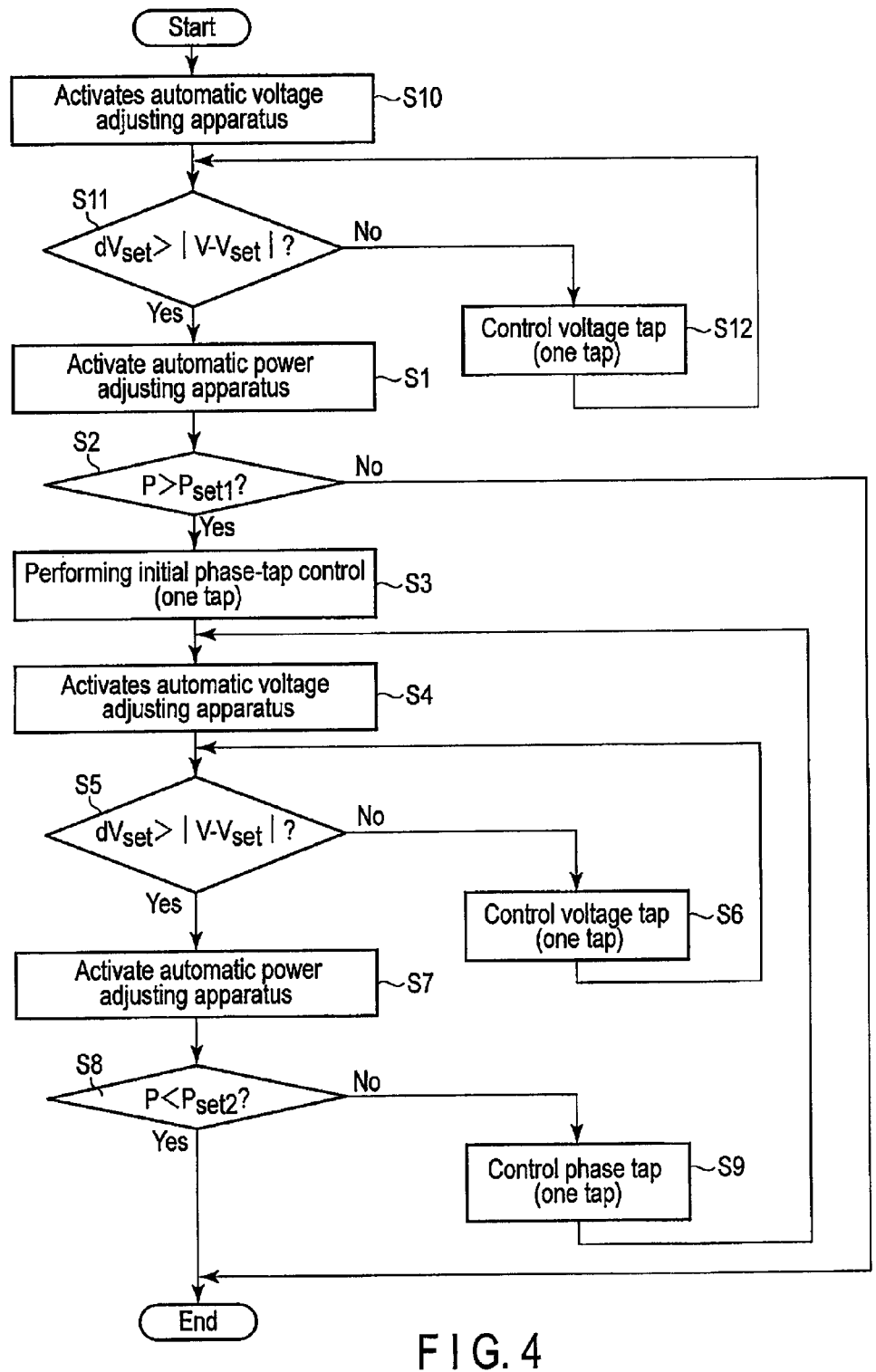
FIG. 4 is a flowchart showing the processes performed in a substation automatic control system according to Embodiment 2 of the invention.

Embodiments will be described with reference to the drawings.

In general, according to one embodiment, there is provided a substation automatic control system. The system includes: a voltage/effective-power adjusting transformer, which is installed between a main bus of a substation and an transmission line, and is equipped with a voltage tap and a phase tap; an automatic effective power adjusting apparatus configured to obtain electrical parameters on the transmission line via an instrument transformer, to calculate effective power on the transmission line and to output a phase-tap control command to the phase tap of the voltage/effective-power adjusting transformer, thereby to suppress the effective power to a value smaller than a prescribed value if the effective power has exceeded the prescribed value; and an automatic voltage adjusting apparatus configured to obtain the electrical parameters on the transmission line via the instrument transformer, to calculate system voltage on the transmission line and to output a voltage-tap control command to the voltage tap of the voltage/effective-power adjusting transformer, thereby to make the system voltage fall within a prescribed range. The automatic power adjusting apparatus activates the automatic voltage adjusting apparatus when the phase tap is controlled, the automatic voltage adjusting apparatus activates the automatic power adjusting apparatus when the voltage tap is controlled, and the automatic power adjusting apparatus suppresses the effective power on the transmission line to the value smaller than the prescribed value while the automatic voltage adjusting apparatus is performing an automatic control, thereby maintaining transmission-side system voltage within a tolerant system voltage range.

FIG. 1 is a configuration diagram that shows an example of a substation automatic control system according to an embodiment of the invention. Between the main bus 11 of a substation and transmission line 12, a transformer 13 is arranged. The transformer 13 has both a voltage adjusting function and an effective-power adjusting function. The voltage/effective-power adjusting transformer 13 comprises a voltage tap 14 and a phase tap 15, which configured to adjust voltage and effective power, respectively. At the primary side of the voltage/effective-power adjusting transformer 13, a CT 16 and VT 17 are provided and used as instrument transformers. The CT 16 measures a current value, which is an electrical parameter of the transmission line. The VT 17 measures a voltage value, which is another electrical parameter of the transmission line.

To an automatic power adjusting apparatus 18, the current on the transmission line, measured by the CT 16, is input, and the voltage on the transmission line, measured by the VT 17, is input. To an automatic voltage adjusting apparatus 19, the voltage on the transmission line, measured by the VT 17, is input. The automatic power adjusting apparatus 18 calculates the effective power on the transmission line. For the purpose of suppressing the effective power to a prescribed effective power, on the basis of the effective power calculated, the apparatus 18 outputs a phase-tap control command S1 to the voltage/effective-power adjusting transformer 13. The automatic voltage adjusting apparatus 19 calculates a system voltage. For the purpose of making the system voltage fall within a prescribed range, on the basis of the system voltage calculated, the apparatus 19 outputs a voltage-tap control command S2 to the voltage/effective-power adjusting transformer 13.

In order to coordinate an automatic control between the automatic power adjusting apparatus 18 and automatic voltage adjusting apparatus 19, a dedicated communication line 20 connects the apparatuses 18 and 19. The automatic power adjusting apparatus 18 and automatic voltage adjusting apparatus 19 therefore operate in coordination with each other, suppressing the effective power to a prescribed value, while maintaining the system voltage on the transmission line. More precisely, the apparatuses 18 and 19 exchange the right of controlling the phase tap and voltage tap with each other. If one of these adjusting apparatuses can control its tap, it first controls its tap and then transfers the right to the other adjusting apparatus. If one of these adjusting apparatuses is not required to control its tap, it abandons the right and transfers the right to the other adjusting apparatus. The adjusting apparatuses 18 and 19 repeat such automatic controls, suppressing the effective power to the prescribed value, while maintaining the system voltage.

FIG. 2 is a configuration diagram showing another example of the substation automatic control system according to the embodiment of this invention. This system differs from the system of FIG. 1, in that the CT 16 and VT 17 are provided on the secondary side of the voltage/effective-power adjusting transformer 13.

FIG. 3 is a flowchart showing the processes performed in a substation automatic control system according to Embodiment 1 of the invention. First, the automatic power adjusting apparatus 18 is activated (Step S1). Then, it is checked whether the effective power P on the transmission line 12 has exceeded a limit value Pset1 preset for the effective power (Step S2). If the effective power P has not exceeded the limit value Pset1, the process will be terminated.

If the effective power P has exceeded the limit value Pset1, the automatic power adjusting apparatus 18 outputs a phase-tap control command S1 for performing the initial phase-tap control (one tap) (Step S3). As a result, the phase tap 15 of the voltage/effective-power adjusting transformer 13 is controlled, suppressing the effective power. Then, the automatic power adjusting apparatus 18 activates the automatic voltage adjusting apparatus 19 (Step S4), and transfers the right of performing control to the automatic voltage adjusting apparatus 19. This right is transferred through the dedicated communication line 20 between the automatic voltage adjusting apparatus 19 and the automatic power adjusting apparatus 18.

Given the right, the automatic voltage adjusting apparatus 19 checks whether the absolute value of the difference between the system voltage V and a prescribed voltage Vset, i.e., |V−Vset|, is smaller than a prescribed tolerant difference dVset (=Vset×tolerance percentage) (Step S5). If the absolute value |V−Vset| falls outside a tolerant voltage range (that is, dVset>|V−Vset|), the automatic voltage adjusting apparatus 19 outputs a voltage-tap control command S2 for performing the voltage-tap control (one tap) (Step S6). As a result, the voltage tap 14 of the voltage/effective-power adjusting transformer 13 is controlled, whereby Steps S4 to S6 are repeated until the absolute value |V−Vset| falls within the tolerant voltage range (Vset±dVset).

If the absolute value |V−Vset| is found fallen within the tolerant voltage range (Vset±dVset), in Step S5, the automatic power adjusting apparatus 18 is activated again (Step S7). Then, the right of performing control is transferred again to the automatic power adjusting apparatus 18.

The automatic power adjusting apparatus 18 checks whether the effective power P on the transmission line has become equal to or smaller than a prescribed value Pset2 to which the effective power P should be suppressed (Step S8). If the effective power P has become equal to or smaller than the value Pset2, the process will be terminated. If the effective power P has not become equal to or smaller than the value Pset2, the phase-tap control (one tap) is performed (Step S9), and Steps S4 to S9 are repeated until the effective power P becomes equal to or smaller than the value Pset2. Note that the phase-tap control is performed by one tap each time, in order not to change the system voltage so suddenly that the transmission network covering a wide area is affected.

In Embodiment 1, the automatic power adjusting apparatus 18 automatically controls the phase tap of the voltage/effective-power adjusting transformer 13. The effective power P on the transmission line is thereby controlled and reduced to the prescribed value Pset2. While the effective power P is being so controlled, the automatic voltage adjusting apparatus 19 keeps automatically controlling the voltage tap of the voltage/effective-power adjusting transformer 13. The effective power can therefore be suppressed to the prescribed value, while the system voltage is being maintained on the transmission line.

FIG. 4 is a flowchart showing the processes performed in a substation automatic control system according to Embodiment 2 of the invention. Embodiment 2 differs from Embodiment 1 shown in FIG. 3, in that steps S10 to S12 are added, first activating the automatic voltage adjusting apparatus 19 (Step S10), then checking the voltage (Step S11) and controlling the voltage tap (Step S12). The same steps as those shown in FIG. 3 are designated by the same reference numbers and will not be described again.

First, the automatic voltage adjusting apparatus 19 is activated (Step S10). The automatic voltage adjusting apparatus 19 calculates the absolute value of the difference between the system voltage V and a prescribed voltage Vset, and then checks whether the absolute value |V−Vset| is smaller than a prescribed difference dVset (=Vset×tolerance percentage) (Step S11).

If the system voltage V falls outside a tolerant voltage range (Vset±dVset) whose reference value is Vset, the automatic voltage adjusting apparatus 19 performs voltage-tap control (one tap) (Step S12), outputting a voltage-tap control command S2. As a result, the voltage tap 14 of the voltage/effective-power adjusting transformer 13 is controlled. Steps S11 and S12 are then repeated until the system voltage V falls within the tolerant voltage range (Vset±dVset). When the system voltage V falls within the tolerant voltage range (Vset±dVset), the automatic voltage adjusting apparatus 19 transfers the right of performing control to the automatic power adjusting apparatus 18. Steps S1 to S9 are then performed in the same way as shown in FIG. 3.

In Embodiment 2, the automatic power adjusting apparatus 18 and the automatic voltage adjusting apparatus 19 are coordinated with each other and perform an automatic control, without any decisions made by the operator. Moreover, the automatic power adjusting apparatus 18 and the automatic voltage adjusting apparatus 19 never perform controls at the same time. Instead, they alternately transfer the right of performing control to each other, achieving an efficient and stable automatic control of a substation.

FIG. 5 is a flowchart showing the processes performed in a substation automatic control system according to Embodiment 3 of the invention. Embodiment 3 differs from Embodiment 1 shown in FIG. 3, in that steps S13 to S15 are added, outputting a phase-tap control command S1 to control the phase tap 15 of the voltage/effective-power adjusting transformer 13, when the effective power P on the transmission line exceeds the prescribed limit value Pset1 for a time equal to or longer than a prescribed time Tset. The same steps as those shown in FIG. 3 are designated by the same reference numbers and will not be described again.

First, the automatic power adjusting apparatus 18 is activated (Step S1). Then, it is checked whether the effective power P on the transmission line 12 has exceeded a limit value Pset1 preset for the effective power (Step S2). If the effective power P has not exceeded the limit value Pset1, the process will be terminated.

If the effective power P has exceeded the limit value Pset1, the automatic power adjusting apparatus 18 resets a timer (Step S13) and makes the timer starts measuring time (Step S14). It is then checked whether the time t measured exceeds the prescribed time Tset (Step S15). When the time 1 exceeds the prescribed time Tset, the process goes to Step S3.

In Step S2, the effective power P on the transmission line 12 may be found restored to equal to or smaller than the limit value Pset1. In this case, the process will be terminated. Note that the timer is reset to count "t" in Step S13, so that whether the timer count t is greater than Tset may be checked in. Step S15 if the effective power P is found larger than Pset1 in Step S2.

In Embodiment 3, once the substation automatic control system has been activated, the phase tap 15 and the voltage tap 14 are repeatedly controlled. Inevitably, some time elapses until the effective power on the transmission line is suppressed. Nonetheless, since a checking process is added in Embodiment 3, the substation automatic control system need not be activated if the power transmission network resumes safe operation thanks to the successful recovery of the power transmission line or successful circuit re-closing operation after accident happens, before the substation automatic control system is activated next time. Hence, unnecessary activation of the substation automatic control system is avoided.

Figure 6:
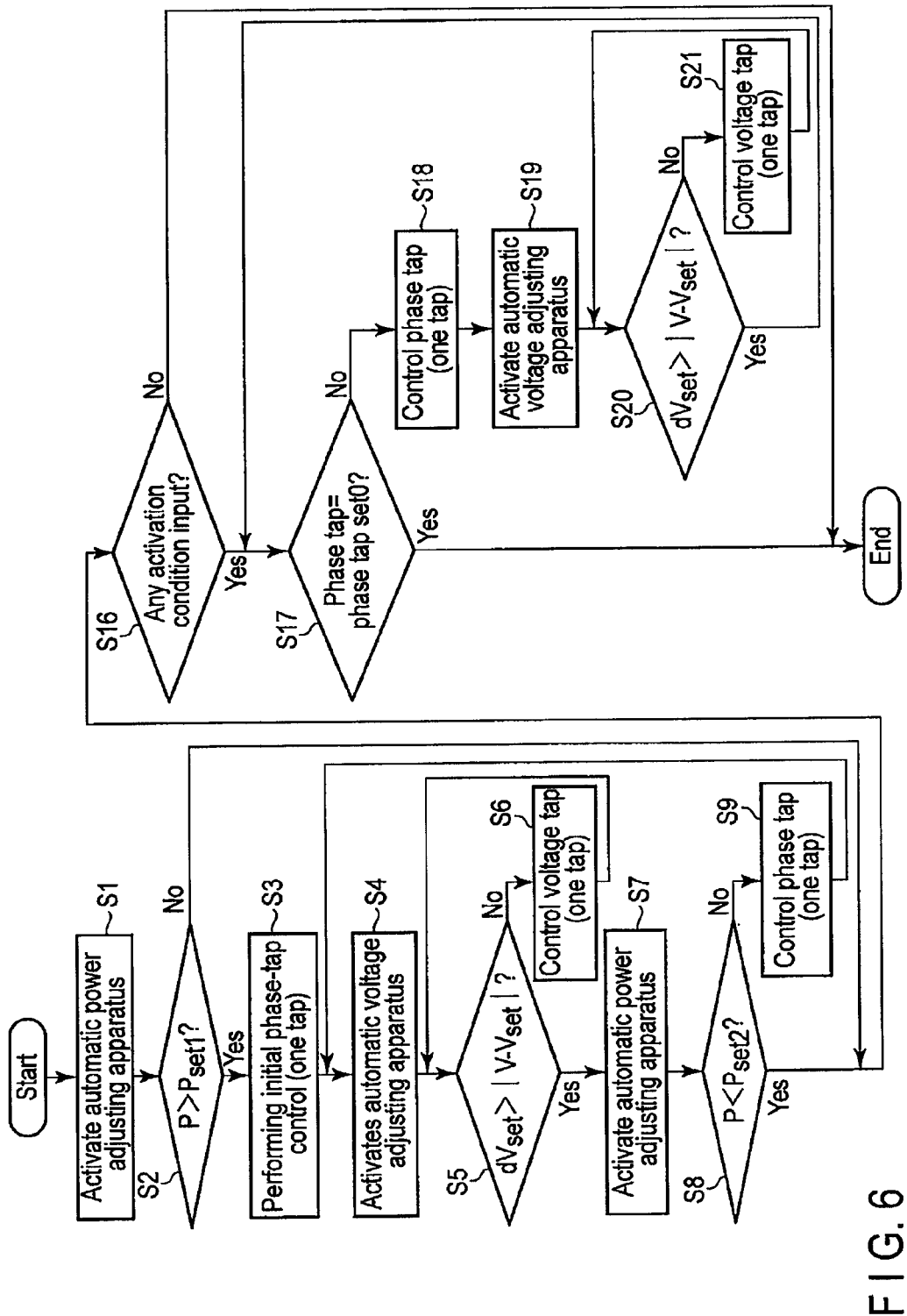
FIG. 6 is a flowchart showing the processes performed in a substation automatic control system according to Embodiment 4 of the invention.

FIG. 6 is a flowchart showing the processes performed in a substation automatic control system according to Embodiment 4 of the invention. Embodiment 4 differs from Embodiment 1 shown in FIG. 3, in that steps S16 to S21 are added, restoring the effective power to the phase tap position before the effective power on the transmission line has been suppressed, in accordance with, if any, activation conditions input externally, while the automatic voltage adjusting apparatus is automatically controlling the voltage tap and maintaining the system voltage. The same steps as those shown in FIG. 3 are designated by the same reference numbers and will not be described again.

As shown in FIG. 6, after the effective power on the transmission line has been suppressed in Steps S1 to S9, the automatic power adjusting apparatus 18 checks whether an activation condition has been input externally (Step S16). That is, the apparatus 18 determines whether an external condition exists, such as recovery of transmission line in the adjacent system network. If no activation conditions have been input externally, the process will be terminated.

Assume that an activation condition has been input externally. Then, it is checked whether the phase tap 15 of the voltage/effective-power adjusting transformer 13 takes the same position as a prescribed phase tap set0 (Step S17). If the phase tap 15 takes the same position as the prescribed phase tap set0, the process will be terminated. If the phase tap 15 takes a position different from that of the prescribed phase tap set0, the automatic power adjusting apparatus 18 controls the phase tap 15, by one tap only (Step S18). The automatic power adjusting apparatus 18 then activates the automatic voltage adjusting apparatus 19 (Step S19), transferring the right of performing control to the automatic voltage adjusting apparatus 19.

The automatic voltage adjusting apparatus 19 checks whether the absolute value of the difference between the system voltage V and the prescribed voltage Vset, i.e., |V−Vset|, is smaller than a prescribed difference dVset (=Vset×tolerance percentage) (Step S20). If the system voltage V falls within a voltage range (Vset±dVset) whose reference value is a prescribed value Vset, the process will return to Step S17.

On the other hand, if the system voltage V falls outside the voltage range (Vset±dVset), the automatic voltage adjusting apparatus 19 will control the voltage tap 14 by one tap, will return to Step S20 and will repeat Steps S20 and S21 until the system voltage V falls within the voltage range (Vset±dVset).

When the system voltage V falls within the voltage range (Vset±dVset), the automatic voltage adjusting apparatus 19 returns to Step S17 again, and then repeats Steps S17 to S21 until the phase tap 15 takes the same position as the phase tap set0.

Thus, the automatic voltage adjusting apparatus 19 automatically controls the voltage tap 14, maintaining the system voltage, and the automatic power adjusting apparatus 18 performs an automatic control, switching the phase tap back to the prescribed phase tap position set0.

In Embodiment 4, the phase tap 15 can be automatically switched back to the initial position it took before the suppression of the effective power, while maintaining the system voltage by using the voltage tap 14. Once changed in position at the activation of the substation automatic control system, the phase tap 15 shall be switched back to the initial position it the phase tap has been. Nonetheless, in Embodiment 4, the phase tap 15 can be automatically switched back to the initial position it took before the suppression of the effective power.

FIG. 7 is a flowchart showing the processes performed in a substation automatic control system according to Embodiment 5 of the invention. Embodiment 5 differs from Embodiment 1 shown in FIG. 3, in that an step S22 is added after Step S5 and before Step S6, and another step S23 is added after Step S8 and before Step S9. The same steps as those shown in FIG. 3 are designated by the same reference numbers and will not be described again.

Assume that the automatic voltage adjusting apparatus 19 or the automatic power adjusting apparatus 18, or both are at such system voltage and effective power as to perform tap operation. Then, both the voltage tap 14 and the phase tap 15 may take positions forbidden in the voltage/effective-power adjusting transformer 13. In this case, neither the voltage tap 14 nor the phase tap 15 can be operated at all.

Therefore, as shown in FIG. 7, before Step S6 of controlling the voltage tap 14, Step 22 is performed, checking whether the voltage tap of the voltage/effective-power adjusting transformer 13 has reached the upper or lower limit of any forbidden position. Further, as shown in FIG. 7, too, before Step S9 of controlling the phase tap 15, Step 23 is performed, checking whether the phase tap of the voltage/effective-power adjusting transformer 13 has reached the upper or lower limit of any forbidden position.

If the voltage tap 14 has not reached the upper or lower limit of the forbidden position, the automatic voltage adjusting apparatus 19 controls the voltage tap 14 by one tap only. Similarly, if the phase tap 15 has not reached the upper or lower limit of the forbidden position, the automatic power adjusting apparatus 18 controls the phase tap 15 by one step only. If either the voltage tap 14 or the phase tap 15 has reached the upper or lower limit of the forbidden position, such automatic adjusting apparatus transfer right of performing control to the other apparatus.

In Embodiment 5, the voltage tap 14 and the phase tap 15 can be prevented from reaching the forbidden tap positions when the substation automatic control system is activated, whereby the effective power on the transmission line is suppressed.

As has been in detail; any embodiment described above can provide a substation automatic control system in which the automatic power adjusting apparatus and automatic voltage adjusting apparatus cooperate with each other, suppressing the effective power to a prescribed value, while maintaining the system voltage on the transmission line.

The present invention is not limited to the embodiments described above. The components of the embodiment can be modified in various manners in reducing the invention to practice, without departing from the spirit or scope of the invention. Further, the components of any embodiment described above may be combined, if necessary, in various ways to make different inventions. For example, some of the component of any embodiment may not be used. Moreover, the components of the different embodiments may be combined in any desired fashion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A substation automatic control system, comprising:
a voltage/effective-power adjusting transformer, which is installed between a main bus of a substation and a transmission line, and which includes a voltage tap and a phase tap;
an automatic power adjusting apparatus configured to obtain electrical parameters of the transmission line via an instrument transformer, to calculate an effective power of the transmission line, and to output a phase-tap control command to the phase tap of the voltage/effective-power adjusting transformer, to suppress the effective power to a value smaller than a predetermined value when the effective power exceeds the predetermined value; and
an automatic voltage adjusting apparatus configured to obtain the electrical parameters of the transmission line via the instrument transformer, to calculate a system voltage of the transmission line, and to output a voltage-tap control command to the voltage tap of the voltage/effective-power adjusting transformer, to make the system voltage fall within a predetermined range,
wherein the automatic power adjusting apparatus activates the automatic voltage adjusting apparatus when the phase tap is controlled, the automatic voltage adjusting apparatus activates the automatic power adjusting apparatus when the voltage tap is controlled, and the automatic power adjusting apparatus suppresses the effective power of the transmission line to the value smaller than the predetermined value while the automatic voltage adjusting apparatus is performing an automatic control, to maintain the system voltage within the predetermined range.

2. The substation automatic control system according to claim 1, wherein the instrument transformer includes first and second instrument transformers configured to transmit electrical parameters to the automatic power adjusting apparatus and the automatic voltage adjusting apparatus, respectively, that are provided at one of a primary winding and a secondary winding of the voltage/effective-power adjusting transformer.

3. The substation automatic control system according to claim 1, wherein when the effective power of the transmission line exceeds a predetermined limit value for a time equal to or longer than a predetermined time limit value, the automatic power adjusting apparatus outputs the phase-tap control command to the phase tap of the voltage/effective-power adjusting transformer to suppress the effective power of the transmission line to the value smaller than the predetermined value.

4. The substation automatic control system according to claim 1, wherein when an activation condition is input externally after the effective power of the transmission line has been suppressed, the automatic power adjusting apparatus restores the phase tap to an initial position of the phase tap before suppressing the effective power, while the automatic voltage adjusting apparatus is performing the automatic control, to maintain the system voltage.

5. The substation automatic control system according to claim 1, wherein the automatic voltage adjusting apparatus activates the automatic power adjusting apparatus, without outputting the voltage-tap control command, when the voltage tap takes a position forbidden in the voltage/effective-power adjusting transformer, and the automatic power adjusting apparatus activates the automatic voltage adjusting apparatus, without outputting the phase-tap control command, when the phase tap takes a position forbidden in the voltage/effective-power adjusting transformer.

* * * * *